(12) United States Patent
Ganai (10) Patent No.: US 8,131,661 B2
(45) Date of Patent: Mar. 6, 2012

(54) EFFICIENT DECISION PROCEDURE FOR BOUNDED INTEGER NON-LINEAR OPERATIONS USING SMT(LIA)

(75) Inventor: Malay K. Ganai, Plainsboro, NJ (US)

(73) Assignee: NEC Laboratories America, Inc., Princeton, NJ (US)

(*) Notice: Subject to any disclaimer, the term of this patent is extended or adjusted under 35 U.S.C. 154(b) by 664 days.

(21) Appl. No.: 12/331,325

(22) Filed: Dec. 9, 2008

(65) Prior Publication Data

US 2009/0222393 A1    Sep. 3, 2009

Related U.S. Application Data

(60) Provisional application No. 61/033,074, filed on Mar. 3, 2008.

(51) Int. Cl.
*G06N 5/00* (2006.01)
(52) U.S. Cl. ............................... 706/46; 706/45
(58) Field of Classification Search ............... 706/46, 706/45
See application file for complete search history.

(56) References Cited

OTHER PUBLICATIONS

Pang, et al, On the Global Minimization of the Value-at-Risk, University of Chicago, Jan. 7, 2004, pp. 1-21.*
Bozzano et al, Encoding RTL Constructs for MathSAT: a Preliminary Report, Electronic Notes in Theoretical Computer Science 144 (2006) 3-14.

* cited by examiner

*Primary Examiner* — Wilbert L Starks
(74) *Attorney, Agent, or Firm* — Bao Tran; Joseph Kolodka (57) ABSTRACT

Systems and methods are disclosed for deciding a satisfiability problem with linear and non-linear operations by:
  encoding non-linear integer operations into encoded linear operations with Boolean constraints by Booleaning and linearizing,
  combining the linear and encoded linear operations into a formula,
  solving the satisifiability of the formula using a solver, wherein the encoding and solving includes at least one of following:
    a. Booleanizing one of the non-linear operands by bit-wise structural decomposition
    b. Linearizing a non-linear operator by selectively choosing one of the operands for Booleanization
    c. Solving using an incremental lazy bounding refinement (LBR) procedure without re-encoding formula, and
  verifying the linear and non-linear operations in a computer software.

26 Claims, 7 Drawing Sheets

```
bool-expr ::= true | false
    | bool-var ;; Boolean variables
    | ¬ bool-expr ;; not
    | (bool-expr ∨ bool-expr) ;; or
    | (bool-expr ∧ bool-expr) ;; and
    | (term-expr ≤ term-expr) ;; less than
    | (term-expr == term-expr) ;; equal term-expr ::= integer-const ;; integer constant
    | integer-var ;; integer variables
    | (term-expr + term-expr) ;; addition
    | (term-expr *c integer-const) ;; constant multiplier
    | ITE (bool-expr, term-expr, term-expr) ;; if-then-else
    | (term-expr * term-expr) ;; multiplier
    | (term-expr / term-expr) ;; divide
    | (term-expr % term-expr) ;; mod
    | (term-expr << term-expr) ;; left shift
    | (term-expr >> term-expr) ;; right shift
    | (term-expr & term-expr) ;; bitwise and
    | (term-expr | term-expr) ;; bitwise or
    | (term-expr ⊗ term-expr) ;; bitwise xor
```

Linearization (multiplier)

- MULT: $z = u * v$, with u,v unsigned integer ($u \geq 0$, $v > 0$)
- *Select* u for Boolean decomposition, $U_{N-1} \ldots U_0$

| | |
|---|---|
| Initialize | $r_0 = 0$ |
| Partial Sum | $r_{k+1} = r_k + ITE(U_k, 2^k *_C v, 0) \quad 0 \leq k \leq N-1$ |
| Final result | $z = r_N$ |

Linearized Multiplier: $z = u * v = u *_L v \quad$ if $(u < 2^N)$

- $z = x * y$, with x,y signed integer $$u = ITE(x < 0, -x, x)$$
$$v = ITE(y < 0, -y, y)$$
$$w = u *_L v$$
$$z = ITE(y < 0 \otimes x < 0, -w, w)$$

FIG. 4

Linearization (divide, mod)

- DIV: d = u/v, with u≥0,v>0 (general case similar to multiplier)
- MOD: r=u%v, with u≥0,v>0 (general case similar to multiplier)

Bounding Constraint $\quad u - v + 1 \leq t *_L v \leq u \quad\quad t$ is integer-var DIV $\quad d = ITE(u < v, 0, ITE(u == v, 1, ITE(v == 1, u, t)))$ MOD $\quad r = ITE(u < v, u, ITE(u == v, 0, ITE(v == 1, 0, u - t)))$

FIG. 5

Linearization (bit-wise operation)

- z = u *bop* v, with u,v unsigned integer, $bop \in \{\&, ||, \otimes\}$
- $U_{N-1} \ldots U_0$ and $V_{N-1} \ldots V_0$ are bit decomposition of U and V, resp.

Initialize $\quad r_0 = 0$

Partial Sum $\quad r_{k+1} = r_k + ITE(U_k \, bop \, V_k, 2^k, 0) \quad 0 \leq k \leq N-1$ Final result $\quad z = r_N$

FIG. 6

Linearization Criteria (LC)

- Given $z = u * v$, prefer u over v as per following rules
- R1: u is an input operand to more MULT
    - to reduce number of operands considered for bit decomposition
- R2: u has a fewer MULT in its transitive input
    - to reduce bound relaxing refinements
- R3: u has lower bound size
    - to reduce bound relaxing refinements

| Example | Candidate-sets for decomposition | Apply LC |
|---|---|---|
| $w_2 = u_1 * w_1$, $w_3 = u_2 * u_3$, $w_1 = u_2 * u_2$, $u_1, u_2, u_2, u_3$ | $Y_a = \{u_1, u_2\}$ $Y_b = \{w_1, u_2\}$ $Y_c = \{u_1, u_2, u_3\}$ $Y_d = \{w_1, u_2, u_3\}$ | $R1: Y_c, Y_d \prec Y_a, Y_b$ $R2: Y_b \prec Y_a$ |

EFFICIENT DECISION PROCEDURE FOR BOUNDED INTEGER NON-LINEAR OPERATIONS USING SMT(LIA)

This application claims priority to Provisional Application Ser. No. 61/033,074 filed Mar. 3, 2008, the content of which is incorporated by reference.

BACKGROUND

Verification problems arising from software programs and system level description are naturally described at higher than Boolean level of abstraction. Reasoning at higher level has several advantages over at Boolean level. Boolean solver typically does not handle high-level structural information such as arithmetic efficiently. Furthermore, the propositional encoding i.e., bit-blasting leads to large formulae depending on the data widths. Satisfiability Modulo Theory (SMT) solvers for higher-level theories such as theory of Equality and Un-interpreted Functions (EUF), Difference Logic (DLS), Bit-vector (BV) and Linear Integer Arithmetic ($\mathcal{LIA}$) have shown quite promising results recently.

SMT solves the problem of deciding the satisfiability of a first-order formula with respect to a background decidable first-order equational theory T (SMT(T)). For the verification of complex designs, one often needs to solve decision problems containing integer non-linear constraints. Due to the undecidability of the problem, one usually considers bounded integers and then either linearizes the formula into a SMT($\mathcal{LIA}$) problem (i.e., theory of linear integer arithmetic with Boolean constraints) or bit-blasts into a SAT problem.

For the theory of integer non-linear operations, the decision problem is un-decidable. Therefore, the decision procedures for such a theory typically assume bounded integer operands. Such an assumption is generally justified, given the verification problems arising from various hardware/software domains use finite width integer (words). Such non-linear operations do arise often, though used sparingly, in system design and verification. Traditionally, integer non-linear operations are handled in Boolean logic by bit-blasting all operands. However, there are some inherent disadvantages in reasoning at the Boolean level. Propositional translations of richer data types such as integers, and high-level expressions such as arithmetic, lead to large bit-blasted formulas. Moreover, the high-level semantics such as arithmetic are often "lost" in such low-level translation, thereby, the SAT search becomes more difficult.

With the growing use of high-level design abstraction to capture today's complex design features, the focus of verification techniques has been shifting from propositional reasoning towards SMT solvers, and SMT-based verification methods such as bounded model checking (BMC). To capitalize on these workhorses, encoding for integer non-linear operations such as multiplication can be carried out using linearization, i.e., one of the operands of multiplication is bit-blasted, and the result is expressed as linear arithmetic operations.

Linearization for non-linear datapaths has been studied in the context of Register Transfer Level (RTL) verification. RTL is a high-level hardware description language (HDL) for defining digital circuits. In RTL verification, linear arithmetic constraints are generated for linear and non-linear datapaths, and are encoded into integer linear programming (ILP) expressions. In, a special attention was given to the modulo semantics. In, a linearization encoding with Booleanization (bit-extraction) was used to generate SMT($\mathcal{LIA}$) i.e., theory of Linear Integer Arithmetic with Boolean constraints. In these approaches, integer bounds were added eagerly as bounding constraints. To handle modulo semantics, additional constraints were also added eagerly.

As reconfirmed in our experiments, the integer bounding constraints cause the solver to slow down significantly, especially, when added eagerly. To overcome this, approaches have used abstraction/refinement of bounds in decision procedure for solving bit-vector and Presburger theories. Other approaches have used un-interpreted functions for abstracting datapaths, accompanied with iterative refinement steps. These approaches are based on bit-blasted encoding, and therefore, they make it difficult to refine the formula without re-encoding it. Re-encoding in Boolean domain typically "destroys" the learning done by DPLL-style SAT solvers and thereby affects the performance of the solvers, as the learning need to be rediscovered. Moreover, it is not obvious how to guide SAT solvers using high-level constraints, as SAT solvers are usually "oblivious" of arithmetic expressions.

The theory of bit-vector SMT(BV) is inherently non-linear. In practice, SMT(BV) solvers use SMT($\mathcal{LIA}$) in the last stage after linearizing bit-vector operations or use complete bit-blasting after applying re-write and inference rules at the preprocess/online stage. In, a decision procedure for non-linear congruences (i.e., equalities on bounded integers) is presented, however, it does not address non-linear inequalities.

Computer algebra systems such as Maxima are intended for the manipulation of symbolic and numerical expressions including factorization, and solving linear equations. However, such systems can not be directly applied to software verification methods such as SMT-based BMC.

SUMMARY

In one aspect, systems and methods are disclosed for deciding a satisfiability problem with linear and non-linear operations by:
  encoding non-linear integer operations into encoded linear operations with Boolean constraints by Booleaning and linearizing,
  combining the linear and encoded linear operations into a formula,
  solving the satisifiability of the formula using a solver, wherein the encoding and solving includes at least one of following:
  a. Booleanizing one of the non-linear operands by bit-wise structural decomposition
  b. Linearizing a non-linear operator by selectively choosing one of the operands for Booleanization
  c. Solving using an incremental lazy bounding refinement (LBR) procedure without re-encoding formula, and
  verifying the linear and non-linear operations in a computer software.

In another aspect, a method to perform computer-aided-design of software includes encoding non-linear integer operations into linear operations with Boolean constraints by linearizing non-linear operations on bounded integers using bitwise structural decomposition; providing the Boolean constraints with linear arithmetic constraints obtained from pure linear operations to a solver of linear integer arithmetic with the Boolean constraints; and verifying the correctness of the software based on the encoding of the non-linear integer operations.

In yet another aspect, the system linearizes constraints, and then performs an encoding to SMT($\mathcal{LIA}$) that can be integrated into an incremental lazy bounding and refinement procedure (LBR) that leverages on the success of SMT($\mathcal{LIA}$) solvers. The formula used in the LBR process does not need to be re-encoded at every step of the procedure. Only bounds on variables need to be asserted/retracted. Hence, the LBR process is very efficiently supported by the recent SMT($\mathcal{LIA}$) solvers.

Advantages of the preferred embodiments may include one or more of the following. The encoding into SMT($\mathcal{LIA}$) extends the reasoning power to decision problems with non-linear integer operations without bit-blasting all operands. Such linearization encoding is highly efficient and improves the performance of SMT solver. As programs and system level descriptions often use bounded integers, such improvement in solver improves the performance of the verification engines that use SMT solvers in the backend. The effectiveness of the instant linearization encoding and LBR procedure reduces the SMT solve time. The LBR process is similarly effective when used in a software verification framework as applied to industry benchmarks.

DESCRIPTION

Figure 1:
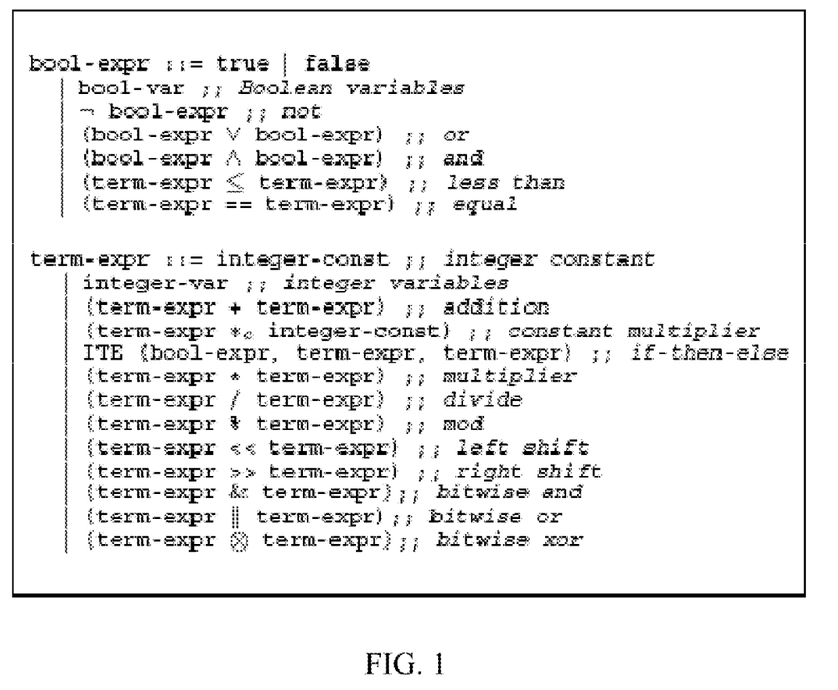
FIG. 1 shows exemplary decision problems with Boolean expressions bool-expr and integer term expressions term-expr.

FIG. 1 shows exemplary decision problems with Boolean expressions bool-expr and integer term expressions term-expr. In one embodiment, the system supports the process for deciding quantifier-free formulas (mixed expressions) by translating term-expr such as those of FIG. 1 to the theory of linear arithmetic over integers ($\mathcal{LIA}$). $\mathcal{LIA}$-var is defined as a theory variable interpreted in the domain of $\mathcal{LIA}$, and $\mathcal{LIA}$-term as a first-order term build from operators such as addition (+), subtraction (−), constant multiplication $*_c$ and LIA-var. Such a theory constitutes a conjunction of integer linear arithmetic constraints (LAC) $\Sigma_i a_i *_c x_i \leq d$. The problem of checking the decidability of LAC over integer domain is NP-complete. SMT($\mathcal{LIA}$) is the problem of deciding satisfiability of Boolean expressions obtained on applying Boolean connectives on propositional atoms and relational operators ($=,\leq$) on two $\mathcal{LIA}$-terms.

In a DPLL-based SMT($\mathcal{LIA}$) solver, SMT $\mathcal{LIA}$ formula is solved by combination of Boolean SAT and $\mathcal{LIA}$-solver, wherein the solver solves each successive integer LAC problem generated. Typically, an $\mathcal{LIA}$-solver employs a layered approach wherein an integer LAC problem is first approximated into a real LAC problem which then is solved using an incremental simplex-based LRA-solver. A branch and cut strategy is used to overcome the incompleteness of the LRA-solver. (Note, a theory of LRA constitutes a conjunction of real LAC.)

Incremental solvers have been used to exploit the sharing. Some of the Simplex-based methods use incremental versions; a tableau is constructed where the rows (corresponding to LAC) are added and deleted incrementally during the DPLL search, but such incremental updates of the tableau are expensive. To reduce the cost, the solver operates on a transformed problem where the tableau is fixed (i.e., rows are not added/deleted) during the decision process, but constraints corresponding to variable bounds change during the search. A SMT(LRA) formula ϕ is first transformed into equi-satisfiable formula $\phi_{eqn} \wedge \phi_{pred}$, where the formula $\phi_{eqn}$ represents the conjunction of linear equations Ax=0, and $\phi_{pred}$ represents the Boolean combination of predicates of the form x⊳◁b where ⊳◁∈{=,<,>,≤,≥} and b is an integer constant. The matrix A is fixed during the decision process. It is the set of inequalities of the form $l_i \leq x_i \leq u_i$ that changes during the decision process where $l_i, u_i$ correspond to the bounds of each variable $x_i$. These inequalities can be asserted/retracted efficiently without undoing the previous pivoting operations. The system exploits this incremental capability in its decision procedure.

Figure 2:
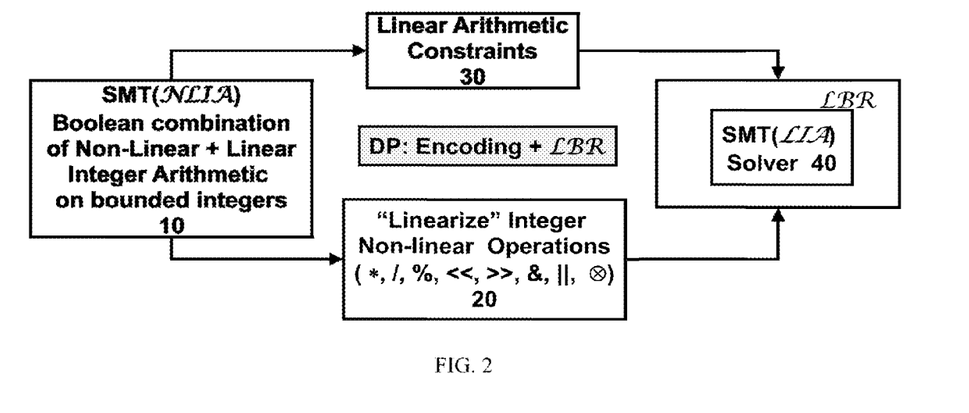
FIG. 2 shows an exemplary process for an improved linearization encoding of bounded integer non-linear arithmetic operations.

FIG. 2 shows an exemplary process for an improved linearization encoding of bounded integer non-linear arithmetic operations such as multiplication, divide, mod, and bitwise operations such as shift, or, xor, and. This encoding translates non-linear operations exactly into SMT($\mathcal{LIA}$), and extends the reasoning power seamlessly to decision problems with mixed linear and non-linear integer operations without the need to bit-blasting all operands. The encoding, based on bitwise structural decomposition, is specifically geared towards improving the search of SMT($\mathcal{LIA}$) solver.

The process of FIG. 2 receives as input an SMT problem with linear and non-linear integer arithmetic on bounded integers (10). Next, the process "linearizes" the integer non-linear operations such as multiplication, divide, mod, and bitwise operations such as shift, or, xor, and (20). The system applies linearization criteria for choosing non-linear operands for Booleanization. Such selection criteria are geared towards reduction of the size of the encoded problem and reduction on the number of iterations of LBR procedure, thereby, minimize the inherent linearization overhead. Additionally, linear arithmetic constraints (30) are applied.

The process then applies an incremental lazy bounding and refinement (LBR) decision procedure (40) on the encoded SMT($\mathcal{LIA}$) problem to leverage on the success of the state-of-the-art SMT($\mathcal{LIA}$) solvers.

The LBR procedure incrementally formulates partially constraint problems in successive iterations. In each iteration, the bounding constraints are either tightened or relaxed, depending on whether the result was spuriously satisfiable (due to under-constraining) or spuriously unsatisfiable (due to over-constraining), respectively, in the previous iteration.

Given an SMT problem with linear and non-linear operations on bounded integers, the system in FIG. 2 encodes the non-linear integer operations such as multiplication (MUL), divide (DIV), modulo (MOD), and bit-wise operations such as left and right shifts (SHIFT), bitwise AND, OR into linear operations, with additional Boolean constraints. These constraints, together with the linear arithmetic constraints obtained from pure linear operations, are provided to the SMT(LIA) solver. Optionally, the system uses the bit-width of the bounded integers as a parameter to encode and iteratively refine it based on the results of the solver.

The process of FIG. 2 provides a number of advantages: (i) it avoids re-encoding of the formula, thereby, allows the SMT($\mathcal{LIA}$) solver to capitalize on the learnt facts and pruning of the search space so far; (ii) it exploits the capability of the recent SMT($\mathcal{LIA}$) solvers to assert/retract constraints efficiently through their use of fixed tableau; and (iii) it effectively guides the SMT($\mathcal{LIA}$) solver to faster resolution, when combined with our linearization encoding.

The encoding does not require explicit bit-blasting of all operands. Given a bound, the system translates the problem exactly to linear arithmetic and Boolean constraints that can be solved by the state of the art SMT($\mathcal{LIA}$) solvers. Moreover, the system achieves an "exact" encoding for DIV, MOD operations. The encoding is transparent to the solver, and can be easily plugged into the existing infrastructure.

In a series of controlled experiments, the linearization encoding reduces the SMT solve time significantly compared to previous linearization approach. Further, the LBR procedure integrated with the improved linearization is quite effective against the state-of-the-art SMT($\mathcal{BV}$) solver.

The system provides better encoding over Bit-wise structural decomposition (BSD) as the structural relationship between a variable and its decomposition provides better guidance to the solver. The system linearizes multiplier, divide, mod, shifts. The linearization criteria provides rules to select non-linear operand for BSD. The system provides incremental formulation using under and over-approximations. Successive refined problems are solved incrementally. Refinements are made to tighten bounds for un-decomposed variables (X variables) or relax bounds for decomposed variables (Y variables). The system exploits SMT($\mathcal{LIA}$) solvers' incremental solving capability with the assertion/retraction of bound constraints.

In sum, the process of FIG. 2 provides a simple encoding of non-linear integer operations such as multiplication, divide, mod, and bitwise operations such as shift, bit-and, bit-or on bounded words. This encoding translates non-linear operations into SMT($\mathcal{LIA}$), i.e., theory of Linear Arithmetic with Boolean constraints.

In one embodiment, the decision procedure of FIG. 2 is integrated in an SMT-based BMC tool. This tool serves as a backend engine for software verification framework called F-Soft, targeted to embedded system software written in C for finding standard programming bugs. Verification is performed via a translation of the given C program to a finite state circuit model. The embodiment targets typical programs that use linear operations more often than non-linear operations. The verification experimentation shows the effectiveness of the decision procedure.

Lazy Bounding and Refinement Procedure (LBR)

The LBR decision procedure that incrementally constraints the formula with bound constraints, and avoids re-encoding the formula is discussed next. Various notations and design choices employed are discussed next.

Let $\phi$ be the encoded SMT($\mathcal{LIA}$) formula obtained after linearization of non-linear expressions as described in the previous section. To minimize the inherent linearization overhead, the system selectively chooses to bit-extract one non-linear operand of MULT over the other, based on Linearization Criteria (LC). Using the criteria, the system partitions the terms in $\phi$ into exclusive sets $X=\{x_1, \ldots, x_n$ and $Y=\{y_1, \ldots, y_m\}$, where $x_i(\in X)$ represents a term not chosen for bit-extraction (referred as X term) and $y_i(\in Y)$ represents a term chosen for bit-extraction (referred as Y term), respectively. The subterms (Eqn 6) belong to X set. For ease of discussion, all variables $v \in X \cup Y$ are assumed to be signed and are bounded by system interval bound $[-2^N, 2^N)$, i.e., $-2^N \leq v \leq 2^N$. The system can use interval analysis (such as) statically on the program to obtain a conservative but much tighter interval bound than system interval bound $[-2^N, 2^N)$. In the following, bounding constraints of the form $-b(v) \leq v \leq b(v)$ are discussed, where $v \in X \cup Y$ and $b(v)$ as the current bound size for the variable v, where $b(v) \leq 2^N$.

In the presence of non-linear operations, Y terms are bound in the formula (as noted earlier, $x^*y = x^*_L y$ if $y \in Y$ and $b(y) \leq 2^N$). Starting with a smaller bound $[-2^{b(y)}, 2^{b(y)})$ ($b(y) < N$) for Y terms, predicates $B_k = (t_k \geq 2^k)$ (Eqn 3) can be simplified to false for $k \geq b(y)$; which in turn, can lead to simplification of the overall-formula. Therefore, Y terms are chosen for bound-relaxing.

To exploit incremental solving capability of the recent SMT($\mathcal{LIA}$) solvers, re-encoding the formula when some bounds change should be avoided as re-encoding of the formula loses all the information that was learnt in the previous run. The system bit-extracts all the non-linear operands (from Y set) using the system bound, i.e., $[-2^N, 2^N)$ once, but assert (i.e., add)/retract (i.e., remove) the bounding constraints on $y \in Y$ terms selectively and incrementally. Using this incremental formulation, the system relax the bounds of $y \in Y$ terms when the formula is unsatisfiable due to insufficient bound size $b(y)$.

In experiments, adding the bounding constraints eagerly, i.e., $-2^N \leq x \leq 2^N$ for all $x \in X$ also increases solve time. Therefore, one embodiment adds the bounding constraints lazily, i.e., bounds are tightened only when the model returned does not meet the bound constraints $[-2^N, 2^N)$ on those X terms. Many times, BMC instances can be shown unsatisfiable quickly without bounding all X terms. In short, the system can relax/tighten bounding constraints on Y/X terms lazily. Intuitively, interchanging X/Y terms for tightening/relaxing would worsen the performance.

---

Algorithm 1 Lazy Bounding and Refinement Algorithm

1: input: SMT(LIA) formula $\phi$ without bounding constraints for non bit-extracted terms $X = \{x_1,\ldots,x_n\}$ and bit-extracted terms set $Y = \{y_1,\ldots,y_m\}$ s.t. $X \cap Y = 0$
2: output: SAT/UNSAT
3:
4: SMT_Init($\phi$) {Construct the (unbounded) logical formula}
5: $X_b := 0$ {Set of $x \in X$ with $[-2^N, 2^N)$ interval bound}
6: for all $y \in Y$ do
7:    $b(y) := 2$ {Initial bound size for y}
8:    SMT_Assert($-b(y) \leq y < b(y)$)) {Bound y variables}
9: end for
10: {Iterate through tightening/relaxing}
11: loop
12:    is_sat := SMT_Check( ) {Invoke SMT(LIA) solver}
13:    if (is_sat = true) then
14:       Let $\alpha(x)$ be the satisfying assignment for each variable $x \in X$
15:       $X_b' := 0$
16:       for all $x \in X \backslash X_b$ do -continued Algorithm 1 Lazy Bounding and Refinement Algorithm

```
17:        if ¬(−2^N ≤ α(x) < 2^N) then
18:            {model value does not satisfy bound}
19:            SMT_Assert(−2^N ≤ x < 2^N) {Bound x variables}
20:            X_b' := X_a' ∪ {x} {New set of bounded x variables}
21:        end if
22:    end for
23:    if (X_b' = ∅) then
24:        {all model values satisfying}
25:        return SAT {Satisfiable}
26:    end if
27:    X_b := X_b ∪ X_b' {update X_b}
28: else
29:    {UNSAT result}
30:    {Check which bound constraints −b(y) ≤ y < b(y) failed}
31:    Let Y_b := {y | Either (−b(y) ≤ y) OR (y < b(y)) cause for UNSAT, and b(y) < 2^N }
32:    if (Y_b = ∅) then
33:        return UNSAT {Unsatisfiable}
34:    end if
35:    for all y ∈ Y_b do
36:        SMT_Retract(−b(y) ≤ y < b(y)) {Retract the tight bounds}
37:        b(y) := 2 * b(y) {Relax by factor of 2}
38:        SMT_Assert(−b(y) ≤ y < b(y)) {Assert the relaxed bounds}
39:    end for
40:    end if
41: end loop
```

LBR takes the formula φ with partitioned sets X and Y, system bound $[-2^N, 2^N)$ and outputs UNSAT, or SAT with a satisfying model. LBR invokes a SMT($\mathcal{LA}$) solver, iteratively without re-encoding the formula φ, and incrementally asserting and retracting bounding constraints. Typically, following procedures are supported in such a solver: SMT_Init to add initial set of logical expressions, SMT_Assert to assert constraints, SMT_Retract to retract constraints, and SMT_Check to check for satisfiability.

Let $X_b$ denote the subset of X terms that currently have bounding constraints. Initially, LBR starts with no bounding constraints on X terms, i.e. $X_b = \emptyset$, but bounding constraints on all Y terms corresponding to the bound size b(y)=2. These constraints together with the formula φ result in a partially constrained formula that is checked for satisfiability. If the formula is satisfiable, the satisfying values α(x) of $x \in X \setminus X_b$ terms is checked against the system bounds. Those variables violating the bound constraints are tightened by asserting the corresponding constraints $-2^N \le x \le 2^N$. The set $X_b$ is also updated accordingly. On the other hand, if all values of x are within the system bound, i.e., the assignment is not spurious, SAT is returned.

If the formula is unsatisfiable, the system determines if the unsatisfiability is due to insufficient bound sizes b(y) of y(∈Y) terms. Unsatisfying assertions, i.e., the bounding constraints either of the form $-b(y) \le y$ or $y < b(y)$ that were sufficient to cause unsatisfiability, are determined. From these, a set $Y_b$ is constructed such that $b(y) \ne 2^N$. If the set $Y_b$ is empty, then clearly the formula is unsatisfiable, and UNSAT is returned; otherwise, for each $y \in Y_b$, the system first retracts the corresponding (tight) bound constraints, relaxes them by a factor 2, and then assert them back. Note, the initial bound b(y) and the scale factor can be chosen heuristically. Then the next iteration is done until the process is done.

Figure 3:
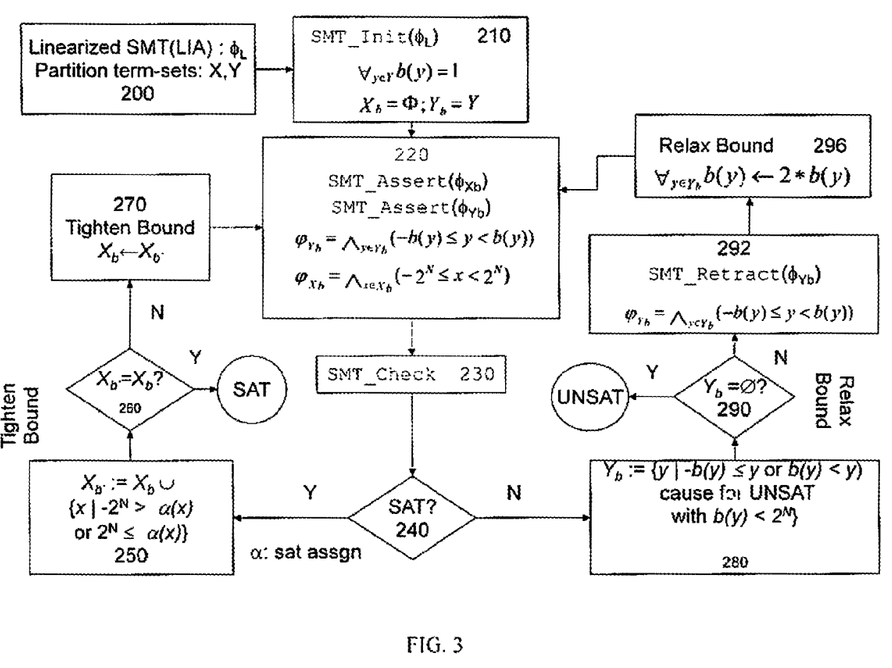
FIG. 3 shows an exemplary Lazy Bounding and Refinement (LBR) process.

FIG. 3 shows an exemplary Lazy Bounding and Refinement (LBR) process. In 200, the input to the process includes formulas such as SMT($\mathcal{LA}$)$\phi_L$ (linearized formula), partition term sets such as X={$x_1, \ldots x_n$} terms not bit-decomposed
Y={$y_1, \ldots y_m$} terms bit-decomposed The bounding constraints can be $-2^N \le x_i, y_j < 2^N$
The process initializes the SMT in 210, and then tests one or more SMT assertions or retractions in 220-230. The process performs incremental formulation by not re-encoding the linearized formula $\phi_L$. The process can use assert/retract procedures of the SMT($\mathcal{LA}$) solver to tighten/relax bounding constraints. In 280-296, the process of FIG. 3 starts $y_j$ variables with small bound, and relaxes as needed by:

$-b(y_j) \le y_j < b(y_j)$, with $b(y_j)=2^\beta$, $0 < \beta \le N$
predicates $B_k$ ($k^{th}$ bit of $y_j$) gets simplified to false for $k \ge \beta$
increase β as required In 250-270, the process of FIG. 3 starts $x_i$ variables with no bounds, and tightens as needed. In one embodiment, the process adds constraints $-2^N \le x_i < 2^N$ as needed. The LBR process iterates until it converges or certain predefined criteria are met.

In one embodiment, the system includes high-level Bounded Model Checking (HBMC) to support non-linear operators such as *, /, >>, <<, %, &, |. As the general problem of solving non-linear expression is un-decidable, the system restricts its analysis to finite domain in one embodiment. These non-linear operators are encoded into linear operators using, predicates, adders and constant multipliers. A linear arithmetic solver (for integer) is used to solve the problem. In one embodiment, an adaptive algorithm over this SMT($\mathcal{LA}$) solver progressively relaxes the bound (up to a large number) when the solution is not found. Traditionally, non-linear operators are handled in Boolean logic by bit-blasting every operands. Comparing, the new encoding for LA with Boolean encoding, the approach is comparable or better than the Boolean approach. There have been techniques for integrating decision procedures for LA theory, not so much on the $\mathcal{LA}$+Non-$\mathcal{LA}$ theory. In many application areas such as hybrid systems, formula with NLA can arise frequently.

Encoding Non-Linear Arithmetic Operations

In the following discussion, for simplicity, all integers are assumed to be signed with a system interval bound $[-2^N, 2^N)$. The overflow constraints are assumed to be handled as per C99/C++98 standard.

Bitwise Structural Decomposition (BSD)

To relate bounded integer-var $u \in ([0, 2^N)$ with its Boolean decomposition variables $B_{N-1} B_{N-2} \ldots B_0$, new Boolean predicates $B_k$ and integer terms $t_k$ for k=N−1 to 0 are defined in a mutually recursive manner as follows:

$$B_k = (t_k \geq 2^k)(0 \leq k \leq N-1) \tag{3}$$

$$t_{k-1} = ITE(B_k, t_k - 2^k, t_k)(1 \leq k \leq N-1) \tag{4}$$

$$t_{N-1} = u \tag{5}$$

The system does not introduce any new integer-var but does introduce additional N−1 linear constraints, as compared to the BRD approach (Eqn 1-2). For example, if u=13, the following is obtained: $t_3$=13, $B_3$=(13≥$2^3$)=1; $t_2$=13−$2^3$=5, $B_2$=(5≥$2^2$)=1; $t_1$=5−$2^2$=1, B=(1≥$2^1$)=0; $t_0$=$t_1$=1, $B_0$=(1≥$2^0$). Note, $B_3B_2B_1B_0$=1101 is a bit-representation of u=13.

The BRD approach relies on the solver to guess the variables $B_k$, whereas in the instant BSD approach, the structural relation between the Boolean and intermediate terms expressions are explicitly captured. Intuitively, such constraints provide "pre-computed learning" to search process; which, otherwise, have to be learnt (e.g., in BRD), incurring backtracking cost. Experimental results confirm this observation.

Integer Multiplication (MULT)

Let z=u*v assuming u,v≥0. Assume, operand u is chosen for bit-extraction. Let $U_{N-1}U_{N-2} \ldots U_0$ denote the bitwise decomposition of the operand u as obtained using either Eqn 1-2 or Eqn 3-5. For k=0 to N−1, with $r_0$=0, the partial sum is as follows:

$$r_{k+1} = r_k + ITE(U_k, 2^k *_c v, 0) \tag{6}$$

Finally, if z is related to $r_N$, i.e., z=$r_N$, $*_L$ denotes the above linearization of the multiplication, and henceforth, is referred to as linearized multiplier. Here, $u*v = u*_L v$ holds if (u<$2^N$). For the general case z=x*y, where the operands x,y can take negative values, u=ITE(x<0,−x,x) and v=ITE(y<0,−y,y). The system encodes w=u*v as described above and relates z with w as z=ITE(y<0⊗x<0,−w, w) where ⊗denote the Boolean XOR operation. One embodiment encodes y=ITE(S,a,b) into SMT($\mathcal{LA}$) by adding two CNF-clauses (!p+A)(p+B) with predicates A=(y==a), B=(y==b).

For a given set of non-linear multiplier operations, it is better to have fewer u operand chosen for bit-extraction to reduce the overall size of the encoded problem after linearization.

Divide (DIV)

For ease of description, the integers are assumed to be positive. Additional constraints are added as described above for the general case. Let w=u/v, with u≥0, v>0. An integer-var term t is used and the following bounding constraints are applied:

$$u - v + 1 \leq t*v \leq u \tag{7}$$

For u,v>0, t satisfying the above constraints equals ⌊u/v⌋. When v is a constant, a constant multiplier $*_c$ is used and otherwise, a linearized multiplier $*_L$ is used. To handle the trivial cases, the divide result w is as follows:

$$w = ITE(u<v, 0, ITE(u=v, 1, ITE(v=1, u, t))) \tag{8}$$

Modulo (MOD)

Let w=u % v, where u≥0, v>0. Similar to DIV, an integer-var term t is used and bounding constraints are added on t as in Eqn 7. To handle the trivial cases, the modulo result w is as follows:

$$w = ITE(u<v, u, ITE(u=v, 0, ITE(v=1, 0, u-t))) \tag{9}$$

Shift

Left and right shifts are expressed in terms of constant divide and multiplier, respectively. Let $v_r$=u>>w, $v_l$=u<<w where u,w>0. $v_r$ and $v_l$ are related as follows:

$$v_r = ITE(w=0, u, \ldots ITE(w=N, u/2^N, 0) \ldots) \tag{10}$$

$$v_l = ITE(w=0, u, \ldots ITE(w=N, w*_c 2^N, 0) \ldots) \tag{11}$$

The number of ITE is equal to N as each operand has bound [−$2^N$,$2^N$).

Bit-Wise Operations

Let z=u bop v assuming u,v≥0, and bop∈{&,P,⊗}. Let $U_{N-1}U_{N-2} \ldots U_0$ and $V_{N-1}V_{N-2} \ldots V_0$ denote bitwise decomposition of the operands u and v, respectively. For k=0 to N−1, with $r_0$=0, the partial sum the defined as follows:

$$r_{k+1} = r_k + ITE(U_k \, bop \, V_k, 2^k, 0) \tag{12}$$

and z=$r_N$.

The encoding for the non-linear operations for bounded integers work with x,y operands as bounded integers, with bit-width of the size n. For simplicity of explanation, x and y are assumed to be positive integers.

Figure 4:
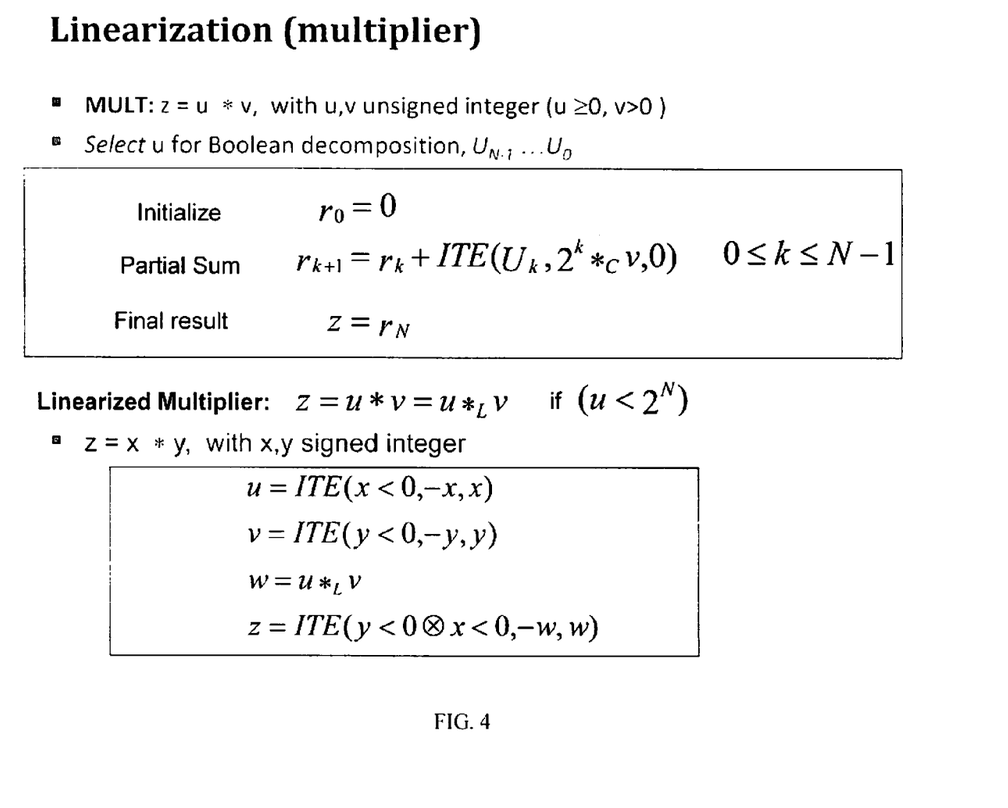
FIG. 4 shows an example of a linearized multiplier.

FIG. 4 shows an example of a linearized multiplier. In this example, the multiplication is denoted (MUL): z=(x*y) where new predicates $b_k$ and integer terms $T_k$ are added to relate with one of the operand, say x.

Figure 5:
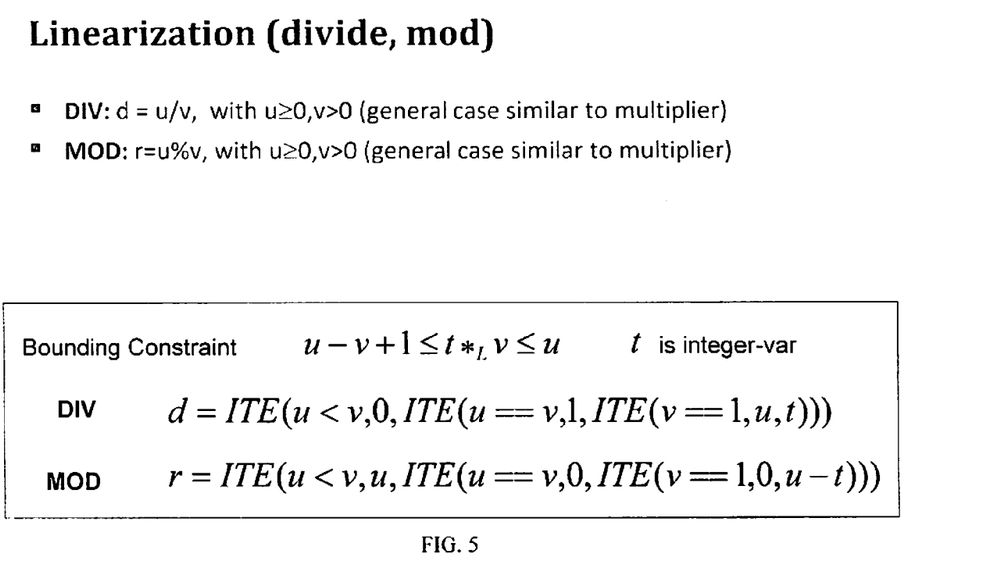
FIG. 5 shows an example of a linearized divider and a linearized remainder.

For k=n to 1, $T_n$=x
$b_k$ := ($T_k$ ≥ $2^k$)//$b_k$ is a Boolean predicate
$T_{k-1}$=ITE($b_k$, $T_{k-2}^k$, $T_k$)//Note: d=ITE(a,b,c)⇔if (a)d=b; else d=c;
For k=0 to n−1, $R_0$=0
$R_{k+1}$=$R_k$+ITE($b_k$, $2^k$*y, 0)
z=$R_n$ FIG. 5 shows an example of a linearized divider and a linearized remainder. For division (DIV): z=(x/y), assuming y>0 z=ITE(x==y, 1, ITE(x<y, 0, R)), where R is a new integer term such that
x−y<MUL(R,y)≤x For the modulo operation, (MOD): z=(x%y), assuming y>0

Z=ITE(x==y, 0, ITE(x<y, x, x−R)), where R is a new integer term such that
x−y<MUL(R,y)<x For left shift: z=(x>>y),
Z=ITE(y=0, x, ITE(y=1, DIV(x/2), ITE(y=2, \ldots, ITE(y=n, DIV(x/$2^n$, 0))) \ldots)

For right Shift: z=(x<<y)
Z=ITE(y=0?x, ITE(y=1, 2×, ITE(y=2, 4x, \ldots ITE(y=n, $2^n$x, 0)) \ldots)

Figure 6:
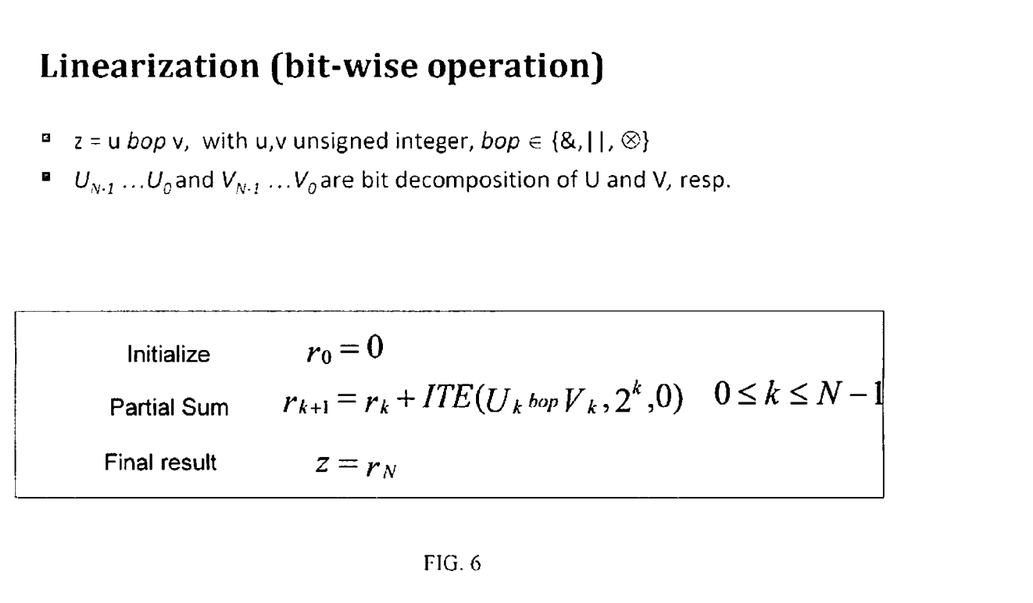
FIG. 6 shows an example of a linearized bit-wise operation.

FIG. 6 shows an example of a linearized bit-wise operation. For bit-wise op: z=(x op y), the operation is similar to bit extraction in MUL, new predicates $bx_k$ and integer terms $Tx_k$ are added to relate with one of the operand, say x.

For k=n to 1, $Tx_n$=x
$bx_k$ := ($Tx_k$ ≥ $2^k$)//$bx_k$ is a Boolean predicate
$Tx_{k-1}$=ITE($bx_k$, $Tx_k$−$2^k$, $Tx_k$)
Similarly, for y:
For k=n to 1, $Ty_n$=y
$by_k$ := ($Ty_k$ ≥ $2^k$)//$by_k$ is a Boolean predicate
$Ty_{k-1}$=ITE($by_k$, $Ty_k$−$2^k$, $Ty_k$)

Note, if x or y are constant, the corresponding Boolean predicates will be either constant true or false.

For k=0 to n−1, $R_0$=0
$R_{k+1}$=$R_k$+ITE($bx_k$ op $by_k$, $2^k$, 0)
z=$R_n$

Booleanization

A bounded integer variable $x \in [0,2^N)$ can be related with its Boolean decomposition variables $B_{N-1}B_{N-2} \ldots B_0$ using the following linear and Boolean constraints, respectively, where $x_k$ is an integer-var such that $x_k \in [0,1]$.

$$x = \sum_{k=0}^{N-1} 2^k *_c x_k \quad (1)$$

$$\bigwedge_k B_k = (x_k == 1) \quad (2)$$

Such bit-extraction approach is referred to as Bit-wise Relational Decomposition (BRD), as used in previous linearization. As discussed below, this will be compared with the system's use of structural decomposition where $B_k$ is related with x directly using arithmetic expressions.

Linearization Criteria

The size of the encoded problem after linearization depends directly on the number of Y terms (which are chosen for bit-extraction). Further, the number of iterations in the LBR procedure also depends on the choice of Y terms. To reduce the size of encoded problem and number of iterations in LBR, and thereby, minimize the inherent linearization overhead, the system uses the following criteria to selectively choose to bit-extract the non-linear operand u of MULT z=u*v over the other operand v while encoding z=u*v:

Rule 1 (R1): The operand u is an input to more MULT compared to v. The goal is to reduce the number of operands considered for bitwise decomposition in a given non-linear decision problem, thereby reducing linearization constraints. In general, one can formulate it as a vertex cover problem.

Rule 2 (R2): The operand u has a fewer MULT in its transitive input compared to v. Intuitively, a term should not be bounded when it can be implied by the bounding constraints imposed on its transitive inputs. Such a rule is intended to reduce the number of bound relaxing iterations (line 37, Algorithm 1).

Rule 3 (R3): The operand u has lower bound size compared to v. Clearly, a lower bound size on u would require fewer bound relaxing steps in the LBR procedure.

Example: Let there be three (non-linear) multipliers in a decision problem, i.e., $w_2 = w_1 * u_1$, $w = u_2 * u_2$, and $W_3 = u_2 * u_3$. Potentially, there are four sets of operands for bit-extraction, i.e., $Y_a = \{u_1, u_2\}$, $Y_b = \{w_1, u_2\}$, $Y_c = \{u_1, u_2, u_3\}$, and $Y_d = \{w_1, u_2, u_3\}$. Using the rule R1, a set $Y_a$ or $Y_b$ is preferred over the remaining sets. Intuitively, a smaller set reduces linearization constraints, and hence size of the encoded problem. Among $Y_a$ and $Y_b$, $Y_a$ is chosen using the rule R2. The iterative bounding constraints on $u_2$ would impose bounding constraints on $w_1$ implicitly. Thus, $w_1$ should not be used for bit-extraction, as adding explicit bounding constraints on $w_1$ (line 12, Algorithm 1) may over-constrain the formula, resulting in more iterations.

Figure 7:
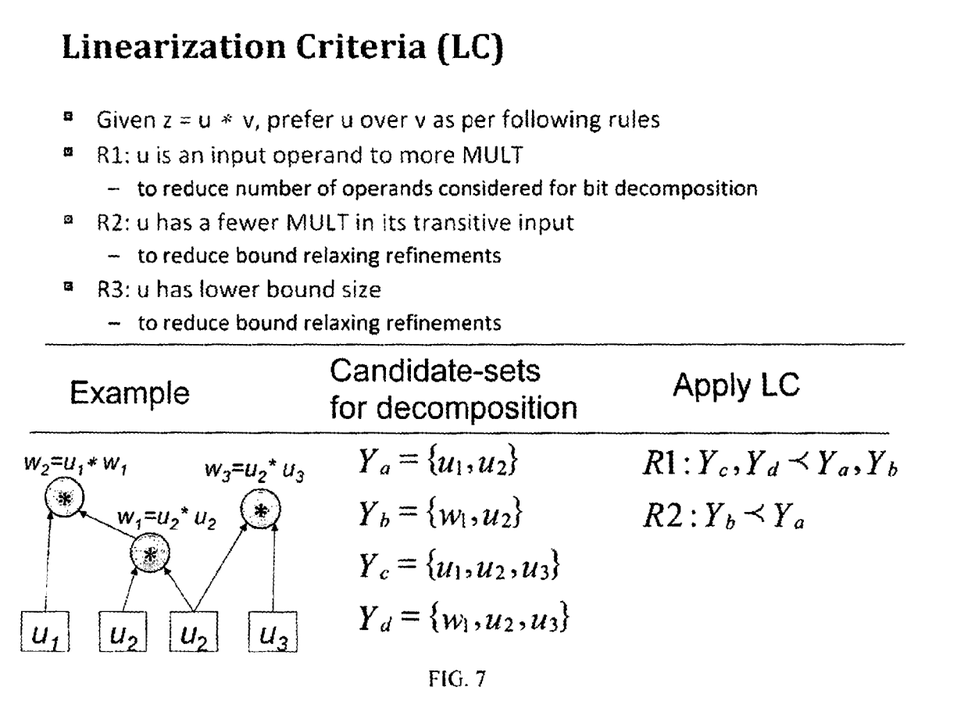
FIG. 7 shows exemplary linearized criteria.

FIG. 7 shows exemplary linearization criteria. Given z=u*v, the system would prefer u over v as per following rules R1: u is an input operand to more MULT
  to reduce number of operands considered for bit decomposition
R2: u has a fewer MULT in its transitive input
  to reduce bound relaxing refinements
R3: u has lower bound size
  to reduce bound relaxing refinements.

Thus, applying the linearization criteria, the result is:

R1: $Y_c, Y_d \prec Y_a, Y_b$

R2: $Y_b \prec Y_a$

Modeling C program and Data Overflow

Using software verification framework F-Soft, the system builds a finite model from a given C program using Boolean and arithmetic expressions, derived automatically by considering the control and data flow of the program under the assumptions of bounded data and bounded recursion.

Figure 8:
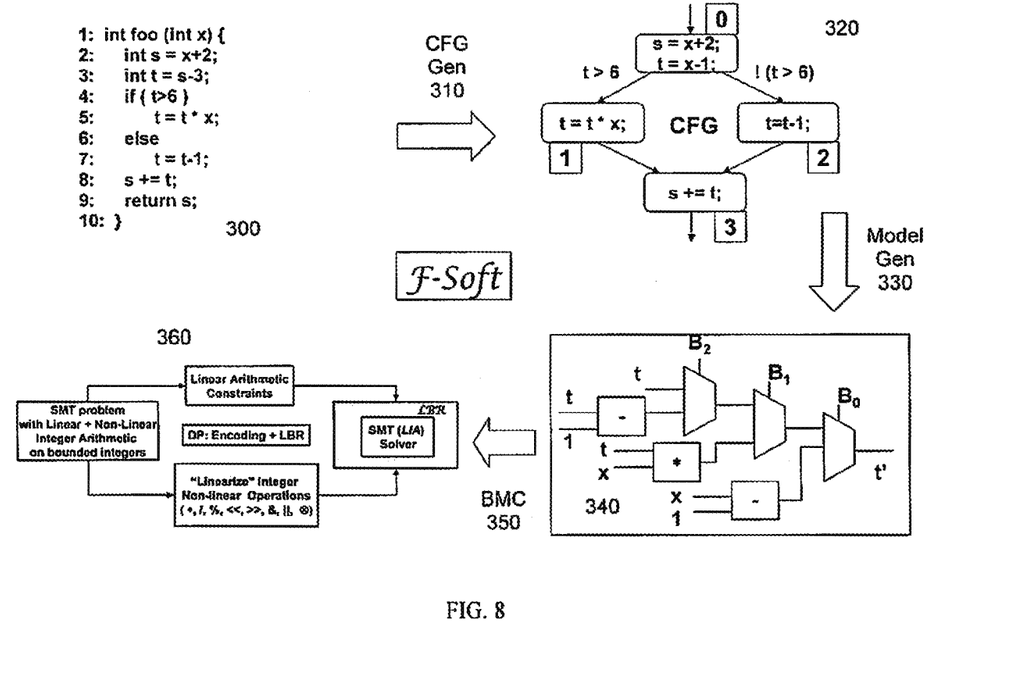
FIG. 8 shows an exemplary system to verify software.

FIG. 8 shows an exemplary system to verify software. The software to be tested is captured in 300, and a context free grammar (CFG) generator is applied in 310 to extract the CFG in 310. Next, a model generator is applied in 330 to generate and RTL in 340. The RTL is processed by the BMC in 350 and the result is then checked by the system of FIG. 2 in 360.

In C, the integer terms are either unsigned or signed. For N-bit arithmetic operations, each signed integer x has interval bound $[-2^{N-1}, 2^{N-1})$, i.e. $-2^{N-1} \leq x \leq 2^{N-1}$, and unsigned term integer term u has interval bound $[0, 2^N)$ i.e., as $0 \leq u \leq 2^N$. As per the C/C++ language standards (C99/C++98), signed overflow is unspecified and unsigned overflow is reduced to modulo $2^N$, i.e., it "wraps around." An implementation can choose to overflow signed integers using modulo operation (C99: H.2.2-clause); however, the system handles verification of implementation independent C-programs where programmers cannot assume any particular handling of signed overflow. In one embodiment, the system handles signed/unsigned bounded integers as per the standard, wherein, the system either detects or does not allow overflow in signed integers. In contrast, typically a SMT(BV) solver would handle a signed (or unsigned) overflow in bit-vector arithmetic implicitly, as "wrap-around". By encoding signed/unsigned integers differently, the system can handle overflows in C programs.

EXPERIMENTS

One embodiment of the LBR process was implemented over the SMT solver yices-1.0.11. The experiments were conducted on a single threaded environment, on a workstation with 3.4 GHz, 2 GB of RAM running Linux. Three sets of experiments were conducted. In the first and second sets, a series of controlled experimentation was conducted which compared a) various lazy and eager combination of X and Y term sets, b) bitwise decomposition in the linearization against a previous approach, c) effectiveness of linearization criteria, with and without, and d) the system's decision procedure against a state-of-the-art SMT solver Z3 (stable version 1.1) supporting non-linear in SMT(BV). For the third set, the LBR decision procedure was used as the backend solver in SMT-based BMC in software verification framework F-Soft. The framework is used to check reachability properties in a set of simple and realistic software programs, respectively.

The results show the benefits of the linearization of non-linear operations on bounded integers using bitwise structural decomposition to generate a SMT($\mathscr{L{\kern-0.1em}A}$) decision problem. Such an encoding is specially geared towards guiding SMT($\mathscr{L{\kern-0.1em}A}$) solver for faster search. For the encoded problem, the lazy bounding and refinement LBR algorithm generates a partially constrained formula with bound constraints that are tightened or relaxed incrementally, as determined from the satisfiability results from the previous runs. Such a procedure avoids re-encoding of the formula and exploits the capability of the state-of-the-art SMT($\mathscr{L{\kern-0.1em}A}$) solver to assert/ retract constraints efficiently. The linearization criteria helps in reducing inherent overhead in linearizing non-linear operations.

The results of the experiments show that the linearization and LBR algorithm are quite efficient and effective in handling decision problems with non-linear operations, compared to the previous approaches based on linearization or the state-of-the-art SMT(BV) solver. The system's ability to handle non-linear arithmetic is crucial for both hardware and software verification methodologies.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass all such modifications.

What is claimed is:

1. A method to decide a satisfiability problem with linear and non-linear operations, comprising:
   encoding non-linear integer operations into encoded linear operations with Boolean constraints by Booleaning and linearizing,
   combining the linear and encoded linear operations into a formula,
   solving the satisifiability of the formula using a solver, wherein the encoding and solving includes at least one of following:
   a. Booleanizing one of the non-linear operands by bit-wise structural decomposition
   b. Linearizing a non-linear operator by selectively choosing one of the operands for Booleanization
   c. Solving using an incremental lazy bounding refinement (LBR) procedure without re-encoding formula, and
   verifying the linear and non-linear operations in a computer software.

2. The method of claim 1, wherein the solver comprises a Satisfiability Modulo Theory—Linear Integer Arithmetic (SMT(LIA)) solver.

3. The method of claim 1, wherein the non-linear integer operation comprises one of:
   multiplication (MUL), divide (DIV), modulo (MOD), and bit-wise operation.

4. The method of claim 3, wherein the bit-wise operation comprises one of: left shift, right shift, bitwise AND, bitwise XOR, bitwise NOT.

5. The method of claim 1, comprising performing the linear and non-liner operations on bounded integers.

6. The method of claim 1, wherein the bit-wise structural decomposition comprises explicitly capturing a structural relationship between the Boolean and intermediate integer expressions and providing as pre-computed learnt constraints to the solver.

7. The method of claim 1, comprising applying one or more of the following linearization criteria to selectively choose one of the operands over other operands for Booleanization:
   a. selecting an operand which is an input operand to more multiplication operations than other operands,
   b. selecting an operand having fewer multiplication operations in a transitive cone than other operands,
   c. selecting an operand having a lower pre-determined bound size compare to other operands.

8. The method of claim 1, wherein the LBR procedure places bounds on variables to be asserted or retracted without re-encoding formulas.

9. The method of claim 1, comprising generating a partially constrained formula with bound constraints that are incrementally tightened or relaxed.

10. The method of claim 9, comprising determining tightening or relaxing bounding constraints from the satisfiability results of the last check.

11. The method of claim 10, wherein tightening comprises adding bounding constraints on the operands that resulted in a spurious satisfiability result.

12. The method of claim 10, wherein relaxing comprises increasing the bound size for the operands that resulted in a spurious unsatisfiability result.

13. The method of claim 1, comprising solving a SMT-based Bounded Model Checking (BMC) on a model with linear and non-linear operations and specified properties, including:

a. unrolling the model for a pre-determined depth,
b. translating the unrolled model and properties into a formula with linear and non-linear operations,
c. performing a satisfiability check on the formula, and
d. verifying the correctness of the model with respect to the specified properties.

14. A computer system to verify a software by deciding a satisfiability problem with linear and non-linear operations, comprising a processor and computer readable code to:
 encode non-linear integer operations into encoded linear operations with Boolean constraints by Booleaning and linearizing,
 combine the linear and encoded linear operations into a formula,
 solve the satisifiability of the formula using a solver, wherein encoding and solving code includes code to perform at least one of following:
  a. Booleanize one of the non-linear operands by bit-wise structural decomposition
  b. Linearize a non-linear operator by selectively choosing one of the operands for Booleanization
  c. solve using an incremental lazy bounding refinement (LBR) procedure without re-encoding formula, and
 display the software verification to a programmer.

15. The system of claim 14, wherein the solver comprises a Satisfiability Modulo Theory—Linear Integer Arithmetic (SMT(LIA)) solver.

16. The system of claim 14, wherein the non-linear integer operation comprises one of: multiplication (MUL), divide (DIV), modulo (MOD), and bit-wise operation.

17. The system of claim 16, wherein the bit-wise operation comprises one of: left shift, right shift, bitwise AND, bitwise XOR, bitwise NOT.

18. The system of claim 14, comprising computer readable code to perform the linear and non-liner operations on bounded integers.

19. The system of claim 14, wherein the bit-wise structural decomposition code comprises code for explicitly capturing a structural relationship between the Boolean and intermediate integer expressions and providing as pre-computed learnt constraints to the solver.

20. The system of claim 14, comprising computer readable code to apply one or more of the following linearization criteria to selectively choose one of the operands over other operands for Booleanization:
 a. an operand which is an input operand to more multiplication operations than other operands,
 b. an operand having fewer multiplication operations in a transitive cone than other operands,
 c. an operand having a lower pre-determined bound size compare to other operands.

21. The system of claim 14, wherein the LBR procedure places bounds on variables to be asserted or retracted without re-encoding formulas.

22. The system of claim 14, comprising computer readable code to generate a partially constrained formula with bound constraints that are incrementally tightened or relaxed.

23. The system of claim 22, comprising computer readable code to determine tightening or relaxing bounding constraints from the satisfiability results of the last check.

24. The system of claim 23, wherein computer readable code to determine tightening comprises computer readable code to add bounding constraints on the operands that resulted in a spurious satisfiability result.

25. The system of claim 23, wherein computer readable code to determine relaxing comprises computer readable code to increase a bound size for the operands that resulted in a spurious unsatisfiability result.

26. The system of claim 14, comprising computer readable code to solve a SMT-based Bounded Model Checking (BMC) on a model with linear and non-linear operations and specified properties, further comprising computer readable code to
 a. unroll the model for a pre-determined depth,
 b. translate the unrolled model and properties into a formula with linear and non-linear operations,
 c. perform a satisfiability check on the formula, and
 d. verify the correctness of the model with respect to the specified properties.

* * * * *